3,721,621
FORWARD-OSMOSIS SOLVENT EXTRACTION
William T. Hough, 312 S. Finley Ave.,
Basking Ridge, N.J. 07920
No Drawing. Continuation-in-part of applications Ser. No. 813,376, Feb. 26, 1969, and Ser. No. 816,765, Apr. 16, 1969. This application Dec. 2, 1969, Ser. No. 881,572
Int. Cl. B01d 13/00
U.S. Cl. 210—22                                    19 Claims

ABSTRACT OF THE DISCLOSURE

In a preferred embodiment, a process for extracting palatable water from a polluted water such as sea water having typical sea salinity, the preferred process including applying pressure to a quantity of sea water adjacent an osmotic membrane to facilitate the forward osmosis of water from the sea water in passing through an osmotic membrane having osmotic pores of maximum diameter into a solution of more concentrated removable solute removable by adding sufficient acid, or base—as the case may be, to render the removable solute insoluble in the diluent of the adjusted pH value, thereafter filtering the insoluble solute from the water which is collected as the palatable water after adjustment of the pH if and when desirable or necessary.

---

This invention is directed to an improved method for extracting palatable water product from non-palatable sea water. This is a continuation-in-part of U.S. Ser. No. 813,376 filed Feb. 26, 1969, now Pat. No. 3,532,621, and No. 816,765 filed Apr. 19, 1969, now Pat. No. 3,696,931.

Background

Prior to this invention, methods of extracting palatable water from unpalatable sea water suffered from many different drawbacks, not the least of which is the cost of production, as well as the usual requirement of conventional power sources, and/or an enormous cost of operation in addition to initial capital investment. Also, many processes failed to obtain the purity of water, i.e. retained too much salt, to qualify for a long life industrially.

It is an object of this invention to overcome or at least reduce the magnitude of problems formerly encountered by prior processes.

In particular, as regards the process known as "reverse osmosis" which in reality is a process of "ultra-filtration" through minute microscopic pores applying a pressure differential on the sea water solution and across the membrane, a major problem is a high salt content as the result of forcing also the salt through the membrane, of undesirably low net extracted water product as a result of having to overcome and/or at least more than equal normal forward osmotic flow in the opposite direction, and of membrane rupture as a result of the extremely high pressures necessary in reverse osmosis in conjunction with the extremely thin and fragile membrane necessary to obtain or to approach a near adequate flow rate of extracted water through the membrane.

SUMMARY OF THE INVENTION

In a preferred embodiment, two formerly separate approaches to desalinization are combined to obtain improved results at reduced capital and operating expenditures, while obtaining a product of high purity. One process of forward osmosis is improved by an improved method of removing a removable solute therefrom; in particular the process comprises sufficiently passing water through a membrane having microscopic pores, from a first water source into a second solution having a removable solute dissolved therein, to form a diluted solution, solute concentration of said second solution being greater than the solute concentration of the first water source, thereby the water in the first water source tending to pass through the membrane into the second solution and thereafter substantially removing the removable solute from the diluted solution thereof, the improvement comprising employing as the removable solute, a solute which has solubility in water dependent upon pH value, substantially retaining a pH value at which the solute is soluble during the passing step, and thereafter removing the solute by adjusting the pH value sufficiently that said solute becomes insoluble, whereby it may be thereafter separated by any desirable and/or conventional means such as filtration, centrifugal action, etc.; if the pH value of the effluent is not about pH 7, it should be adjusted to that value. The process preferably employs an osmotic membrane and the second solution is preferably aqueous.

The second process which is preferably combined with the preceding process to result in a more preferred process of this invention, is actually derived from the concept of reverse osmosis, except that this inventive process is minus the problems normally associated with reverse osmosis. In particular, the preceding inventive process does not have the problem of overcoming and/or at least equalling a "forward" osmotic flow, since the process utilizes forward flow by osmosis; accordingly, also because by virtue of the osmosis resulting from the sea water saline solution being the solution containing the lesser amount of solute, there is absolutely no tendency for the salts of the sea water to pass through the osmotic membrane, rather there exists the reverse tendency for the removable salt to pass into the sea water. Because of this tendency, the osmotic membrane employed may be of maximum pore size thereby achieving a high flow rate of extracted water by osmosis. Also, however, because when a removable solute is employed, there no longer is the requirement that the pores be sufficiently small to completely or to substantially exclude the passing of sea salts therethrough, since there is no great harm done if part of the removable salt passes into the sea water. Therefore, the invention may employ either an osmotic membrane, or alternatively a non-osmotic membrane, merely the membrane being characterized by microscopic pores such as for example of the type employed in ultrafiltration (reverse osmosis), but with the exception that the pore may be larger for this invention because there is no tendency for the sea salts to pass into the solution of removable solute.

Thus, a preferred embodiment of the process of this invention employs a pressure to improve flow rate, and employs a removable solute (in greater concentration than the sea salt of the sea water) of which the solubility is dependent upon minor adjustments in pH value of the preferably aqueous solution thereof, preferably the membrane being an osmotic membrane.

Detailed description

In a process comprising sufficiently passing water through a membrane having microscopic pores, from a first water source into a second solution having a removable solute dissolved therein, to form a diluted solution, solute concentration of said second solution being sufficiently greater than solute concentration of said first water source that said water tends to pass toward said second solution, and thereafter substantially removing said removable solute from said diluted solution, the improvement comprising employing as said removable solute, a removable solute having solubility in water dependent upon pH, substantially retaining pH at a value that said removable solute is substantially soluble during said passing, and said removing comprising adjusting pH value sufficient that said removable solute becomes insoluble in said diluted solution.

In a preferred embodiment, as noted above, the membrane is an osmotic membrane, and preferably the second solution is an aqueous solution.

Normal and preferred operating procedure would be to separate the diluted solution from contact with the membrane before making the solute thereof become insoluble, and after rendering the solute thereof insoluble, to remove the extracted water therefrom by typically filtration, or any other convenient or desirable or conventional method of removing precipitates from diluents.

A particular advantage of the process of this invention employing a removable solute which is removable by virtue of solubility dependent upon pH value, is the fact that so very little acid or base, as the case may be, is required to change the solute from the soluble state to the insoluble state, or from the insoluble state to the soluble state, and from the fact that such a solute may be reused in a cyclic process over an infinite period of time, both of these advantages resolving themselves into improved economics.

Because as noted above there is no tendency for sea salts to flow into the diluted solution (second solution) of higher solute concentration, and because there is no opposite flow nor flow tendency to overcome, a minor pressure differential across the membrane, with the higher pressure on the sea water side of the membrane acting against the sea water (to attempt to force the water thereof through the membrane), results in a major increase in flow to result in a higher rate of extraction of extracted water into the removable solute, while the pressure required is insufficient to rupture the membrane.

In the above described process of this invention, the solute is removable because of its solubility being dependent upon the pH of an aqueous solution thereof. The solute is soluble in at least one of a solution of acid pH value, a solution of neutral pH value, or a solution of basic or alkaline pH value, and by adjustment of the pH to a higher or lower pH value, as the case may be—as dependent upon the particular removable solute employed, the removable solute thereby becomes insoluble. Preferably the solute is either soluble or insoluble at a pH value near pH 7, where little or no adjustment of pH value is required for the diluent after separating the extracted diluent from the insoluble solute. Typically, the pH may be adjusted by a base or alkaline material such as a hydroxide and/or a carbonate of calcium (or other metal which when reacted with the acid anion such as sulfate or sulfite forms a water insoluble precipitate); the solute as a precipitate from such an addition may thereupon be easily removed from the diluent effluent water by any convenient method such as filtration, centrifugal action, etc. Typical removable solutes removable by pH adjustment of the aqueous solution include those soluble in aqueous acid such as aqueous sulfurous acid or aqueous sulfuric acid, including such removable solutes as (for example) carbonates, oxalates, tartrates, and the like, of metals such as calcium, strontium, barium, nickel, cobalt, copper, mercury, silver, iron, and the like. Preferred solutes include iron sulfide (with additionally its iron-water bacteria-purifying action) and/or calcium sulfite; calcium sulfite is soluble in sulfurous acid, and iron sulfide is soluble in dilute acid(s). The acid such as sulfurous acid, after filtration of the precipitate, is neutralized by typically calcium carbonate or hydroxide to form a precipitate to be thereafter filtered; the amount of acid to be neutralized is substantially insignificant cost-wise and similarly requires a substantially insignificant amount of neutralizing calcium carbonate and/or hydroxide cost-wise.

In another similar embodiment, employing the opposite pH mechanism, a removable soluble salt such as silver sulfate becomes insoluble and the precipitate filterable in an acid pH of water solution, by the mere addition of sufficient acid such as typically sulfurous acid to lower the acid pH, which after filtration (for example) is (the solute precipitate is) neutralized with a reactant such as calcium carbonate and/or calcium hydroxide, for example.

In embodiment employing a pH change to render the removable soluble and/or insoluble, as the case may be, the sole significant cost is the original capital investment in equipment and removable solute: (1) because (for example) for any one or more of the pH-removable solutes such as typically listed above for purposes of mere illustration, the change in pH required would rarely exceed an increase (or decrease, as the case may be) of pH 1; (2) because about 40 p.p.m. of "OH" anion or "$CO_3$" anion each require about 300 p.p.m. of (for example) $CaCO_3$ (calcium carbonate) to increase $H_2SO_3$ (sulfurous acid) solution by pH 1, and accordingly 300 lbs. of calcium carbonate per one million pounds of water; (3) because 1,000,000 lbs. of water is about 300 thousand gallons of water; and (4) because 2,000 lbs. of calcium carbonate ($CaCO_3$) costs about $14. Therefore, based on calcium carbonate as an illustrative example, one thousand gallons of water by the pH-adjustment inventive process is based on one pound of calcium carbonate—i.e., $0.007 per one pound of calcium carbonate or per 1,000 gallons of water by the pH-adjustment inventive process is produced. The additional operating cost of sulfurous acid (for example), membranes, and solute (removable) would amount to about an additional 2¢ or 3¢, at most per 1,000 gallons of pure salt-free water produced. Thus, the amortized initial capital investment is more than offset by the value of the water produced as well as the need fulfilled.

In the second major approach of this invention, the process comprises sufficiently passing a first solvent through a membrane having microscopic pores, from a first-solvent source, into a second solution having a removable solute dissolved therein, to form a diluted solution, solute concentration of said second solution being greater than solute-concentration of said first-solvent source and said passing comprising establishing a physical pressure differential across said membrane between said first-solvent source and said second solution, and thereafter removing said removable solute from said diluted solution, preferably the first-solvent source comprising saline water solution such as sea water, and preferably the second solution comprising an aqueous solution; also, as already discussed above, the removable solute preferably is one of which the solubility thereof in water is dependent upon pH of the aqueous solution.

However, more broadly, any removable solute may be employed for the process embodiments employing the positive differential pressure, such as any of those removable solutes described in the parent application U.S. Ser. No. 813,376 filed Feb. 26, 1969, the total disclosure of which is hereby incorporated by reference into this application.

In regard to the positive differential pressure inventive embodiment simultaneously employing the inventive forward osmosis principle, the positive differential pressure in combination with forward osmosis may be also applied to a process which does not require removal of the prepared solute into which osmosis takes place, such as that process disclosed in U.S. application Ser. No. 816,765 filed Apr. 16, 1969, the total disclosure of which is hereby incorporated by reference into this application; accordingly, the solute may be any comestible (eatable) solute employed in any consumable (eatable) solvent such as (for example) water, concentrated milk, chocolate syrup, sugar solution, or the like, provided that the solute concentration of the comestible solute is greater than the solute concentration of the salt (for example) in the sea water (for example), with the positive pressure differential further enhancing the forward osmotic flow of the water being extracted, the extracted water being immediately consumable without separation of the comestible solute therefrom, thereby not requiring the diluted solute to be removed. The food value of the comestible solute offsets the non-cyclic nature of the process, the comestible solute not being reusable to extract water in the future.

The process which may be employed in the article preferably having the top of the cup (or other vessel) made of a filter material for filtering the precipitated solute, may be defined as a process comprising passing by osmosis water from an aqueous solution comprising a first solute dissolved therein, through a semipermeable membrane into a second solute selected from the group consisting of (a) an aqueous sulfurous acid solution of a sulfite of an alkaline earth metal oxide, said passing comprising placing said aqueous solution of said first solute into intimate contact with a face of said member and placing, into intimate contact with an opposite face of said membrane, said second solute in an amount sufficiently greater than said first solute's concentration that said osmosis takes place, and thereafter adding an alkaline earth metal composition selected from the group consisting of a carbonate and a hydroxide in an amount sufficient to precipitate said second solute as a water-insoluble precipitate. The aqueous solution preferably is sea water and the first solute contained therein preferably comprises sea salts. The metal oxide of the complex is preferably selected from the group consisting of magnesium oxide, iron oxide, and aluminum oxide, or combinations thereof, and the process preferably includes the step of separating the water from the precipitate. The alkaline earth metal composition is of an alkaline earth metal preferably selected from the group consisting of calcium, barium, and magnesium.

The process of isolating the precipitated metal oxide from the sulfite of the alkaline earth metal may be defined as a process comprising (1) acid leaching a composition comprising (a) a sulfite of an alkaline earth metal and (b) an oxide of a metal selected from the group consisting of iron, aluminum, and magnesium, said leaching comprising treating said composition with a strong inorganic acid which produces a water-soluble salt of said metal, (2) separating the filtrate from the residue after the leaching, (3) adding to the filtrate an alkaline earth metal composition selected from the group consisting of a carbonate and a hydroxide, sufficiently to precipitate said metal as an oxide, and (4) thereafter treating said precipitate with a member selected from the group consisting of sulfur dioxide and sulfurous acid, sufficiently to produce a water-soluble sulfur dioxide complex of said metal oxide, the complex being thereby suitable for reuse as the second solute in the process described immediately above. Preferably, the strong acid is selected from the group consisting of hydrochloric and nitric acids.

Although any suitable, desirable and/or conventional membrane of microscopic porosity or of osmotic permeability, depending upon the particular inventive embodiment being practiced, may be employed such as a cellulose acetate membrane, animal bladder, any of various suitable plastics, and the like, for the process embodiments employing substantially non-corrosive solute(s) and/or solvents and/or additives, there already exist known corrosive-resistant plastics and membranes thereof which for example are acid-resistant and/or alkaline-resistant. For example, conventional polyethylene membrane is both acid-resistant and base-resistant and suitable for any aqueous system and has an additional advantage of being formable into desired shapes merely by employing boiling water, but nevertheless is resistant to continuous temperatures of about 140 degrees or more. Also the conventional polyethylene is readily commercially available in the membrane form. Linear polyethylene thermoplastic membranes are resistant to acids, bases, alcohols, aqueous systems thereof, etc., and reasonably resistant to heat (a continual operation at up to 180 degrees F.). Unmodified polypropylene is highly resistant to most acids and alkalies, and to organic solvents below about 176 degrees F., and suitable for aqueous solutions.

The various embodiments of the inventive process(es) of this invention include equivalents and/or substitutions which would be obvious to a person of ordinary skill in this art, including also obvious modifications and/or variations on the above disclosed invention.

What I claim is:

1. In a process comprising sufficiently passing water through a membrane having microscopic pores, from a first water source into a second solution having a removable solute dissolved therein, to form a diluted solution, solute concentration of said second solution being sufficiently greater than solute concentration of said first water source that said water tends to pass toward said second solution, and thereafter substantially removing said removable solute from said diluted solution, the improvement comprising employing as said removable solute, a removable solute having solubility in water dependent upon pH, substantially retaining pH at a value that said removable solute is substantially soluble during said passing, and said removing comprising adjusting pH value sufficient that said removable solute becomes insoluble in said diluted solution.

2. A process according to claim 1, in which said second solution is an aqueous solution, in which said membrane is an osmotic membrane, and in which said passing comprises osmosis.

3. A process according to claim 2, including substantially isolating the insoluble solute from aqueous effluent thereof, and adjusting pH value of said isolated solute sufficiently that said removable solute becomes soluble in water.

4. A process according to claim 2, including establishing a physical pressure differential across said membrane between said first source and said second solution, sufficiently that said differential improves said passing.

5. A process according to claim 2, in which diluted solution is separated from said membrane substantially before adjusting pH value to form said insoluble solute.

6. A process according to claim 5, including establishing a physical pressure diferential across said membrane between said first source and said second solution, sufficiently that said differential improves said passing.

7. A process according to claim 5, in which said removable solute comprises a composition having a cation selected from the group consisting of calcium, strontium, barium, nickel, cobalt, copper, mercury, silver and iron, and an anion selected from the group consisting of carbonate, oxalate, tartrate, sulfite, and sulfide.

8. A process according to claim 5, in which said second solution includes an acid selected from the group consisting of aqueous sulfurous acid and aqueous sulfuric acid.

9. A process according to claim 5, in which said adjusting comprises adding sufficient base to make said removable solute insoluble, said base being selected from the group consisting of carbonate and hydroxide.

10. A process according to claim 5, in which said removable solute comprises silver sulfate, said second solution has a basic pH value, and said adjusting comprises adding sulfurous acid.

11. A process according to claim 5, in which said first source comprises substantially saline water.

12. A process according to claim 11, in which said saline water comprises sea water.

13. A process according to claim 1, including establishing a physical pressure differential across said membrane between said first source and said second solution, sufficiently that said differential improves said passing.

14. A process according to claim 1, in which said first-solvent source comprises saline water, said second solution comprises an aqueous solution, and said removable solute has a solubility in water dependent upon pH value.

15. A process according to claim 1, including adjusting pH value of diluent to about pH 7 after removing said diluted solution from contact with said membrane and subsequent to removing therefrom said insoluble solute.

16. A process according to claim 1, in which said removable solute comprises a composition having a cation selected from the group consisting of hydrogen, calcium, strontium, barium, nickel, cobalt, copper, mercury, silver and iron, and an anion selected from the group consisting of carbonate, oxalate, tartrate, sulfite, sulfide, sulfate, and hydroxide.

17. A process according to claim 1, in which diluted solution is separated substantially from said membrane substantially before adjusting pH value thereof to form said insoluble solute.

18. A process comprising passing by osmosis water from an aqueous solution comprising a first solute dissolved therein, through a semipermeable membrane into a second solution of a second solute comprising a water-soluble sulfur dioxide complex of a metal oxide, said passing comprising placing said aqueous solution of said first solute into intimate contact with an opposite face of said membrane, said second solute in an amount sufficiently greater than said first solute's concentration that said osmosis takes place, and thereafter adding an alkaline earth metal composition selected from the group consisting of carbonate and a hydroxide in an amount sufficient to precipitate said second solute as a water-insoluble precipitate, said aqueous solution of said first solute comprises sea water containing sea salts, said metal oxide being elected from the group consisting of magnesium oxide, iron oxide, and aluminum oxide, said process further including separating said precipitate from filtrate water after said adding, and including treating said precipitate with a member selected from the group consisting of sulfur dioxide and sulfurous acid, sufficiently to produce said second solute.

19. A process according to claim 18, including producing said water-soluble sulfur-dioxide complex by steps comprising (1) acid leaching a composition comprising (a) a sulfite of an alkaline earth metal and (b) an oxide of a metal selected from the group consisting of iron, aluminum, and magnesium, said acid leaching comprising treating said composition with a strong organic acid which produces a water-soluble salt of a metal, (2) separating the filtrate from the residue after said leaching, (3) adding to said filtrate an alkaline earth metal composition selected from the group consisting of a carbonate and a hydroxide, sufficiently to precipitate said metal as an oxide, and (4) thereafter treating said precipitate with a member selected from the group consisting of sulfur dioxide and sulfurous acid, sufficiently to produce said water-soluble sulfur dioxide-complex of said metal oxide, said inorganic acid being selected from the group consisting of hydrochloric acid and nitric acid.

References Cited
UNITED STATES PATENTS

| | | | |
|---|---|---|---|
| 3,519,558 | 7/1970 | Cooper et al. | 210—23 |
| 3,130,156 | 4/1964 | Neff | 210—152 |
| 3,357,917 | 12/1967 | Humphreys | 210—22 |

FRANK A. SPEAR, JR., Primary Examiner

U.S. Cl. X.R.

210—321